C. L. HARRISON.
BOLL WEEVIL DESTROYER.
APPLICATION FILED NOV. 10, 1920.
1,380,902.
Patented June 7, 1921.
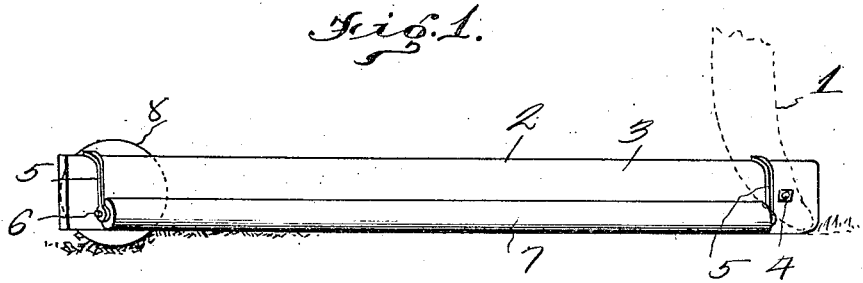
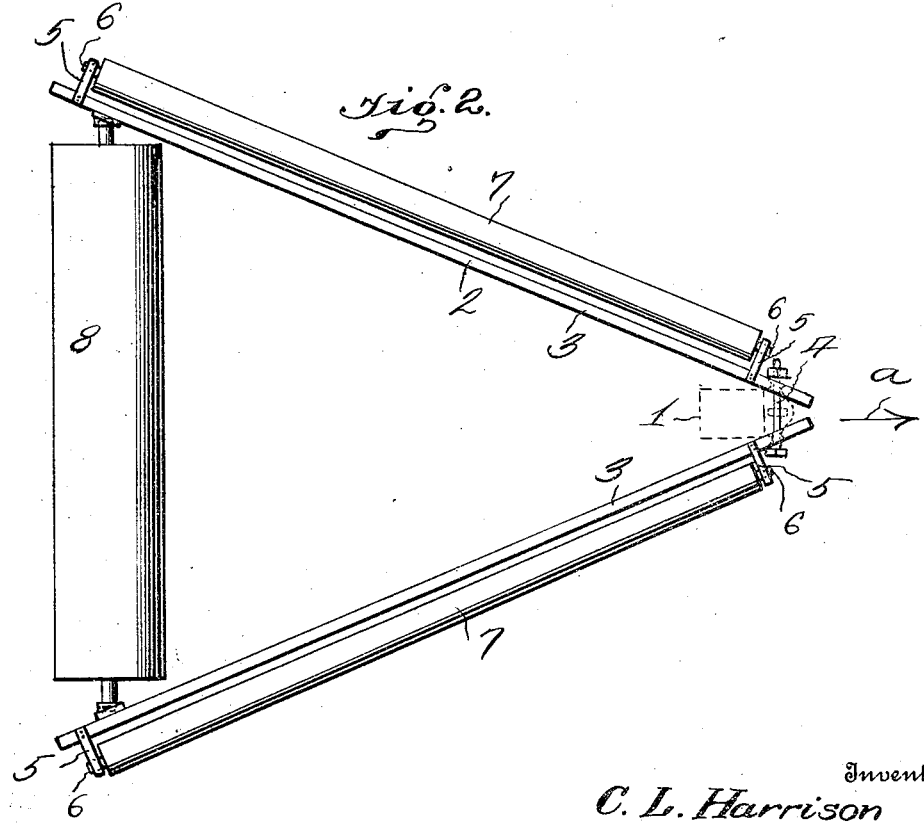
Inventor
C. L. Harrison
By D. Swift
Attorney

UNITED STATES PATENT OFFICE.

CIM L. HARRISON, OF ANTLERS, OKLAHOMA.

BOLL-WEEVIL DESTROYER.

1,380,902.

Specification of Letters Patent.

Patented June 7, 1921.

Application filed November 10, 1920. Serial No. 423,033.

*To all whom it may concern:*

Be it known that I, CIM L. HARRISON, a citizen of the United States, residing at Antlers, in the State of Oklahoma, have invented a new and useful Boll-Weevil Destroyer; and I do hereby declare the following to be a full, clear, and exact description of the invention, such as will enable others skilled in the art to which it appertains to make and use the same.

The invention relates to boll weevil destroyers and has for its object to provide a device of this character which may be attached to a cultivator foot and comprising rearwardly diverging scraper members adapted to scrape over the ground after rollers carried by the diverging members and located forwardly of the same and roll the ground and kill the weevils and eggs on the ground. The diverging members form means for scraping over the rolled eggs and weevils and cause them to be covered. Also to provide a roller transversely disposed and located between the rear end of the diverging scraper members and forming means whereby the weevils and eggs after being rolled and covered by the scraper will be additionally rolled and embedded in the soil.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:—

Figure 1 is a side elevation of the destroyer.

Fig. 2 is a top plan view of the destroyer.

Referring to the drawings, the numeral 1 designates a conventional form of cultivator foot and 2 the weevil destroyer. Destroyer 2 comprises a pair of rearwardly extending diverging scraper members 3, the forward ends of which are adapted to engage on each side of the cultivator 1 and be held on said cultivator foot by means of a bolt 4, which bolt passes through the forward ends of the scraper member 3 and through the cultivator foot 1. Extending outwardly and downwardly from the upper edges of the scraper members 3 are brackets 5 in bearings of the lower ends of which brackets, the pintles 6 of weevil crushing rollers 7 are rotatably mounted, said rollers forming means for crushing and killing the weevils on the ground and for crushing the eggs which are also on the ground.

The scraping members 3 forming means for covering up the eggs and the crushed or injured weevils so that as the destroyer as a whole continues its movement in the direction of the arrow *a*, the transversely disposed roller 8, which is a heavy roller and which extends below the under edge of the scraper will as it advances compress the ground and consequently cause the eggs which have been rolled by the rollers 7, then covered with soil by the scrapers 3, to be thoroughly embedded in the soil.

From the above it will be seen that a boll weevil destroyer is provided, which may be attached to a cultivator foot after the cultivator shovel has been removed and one wherein the weevil and the eggs which are on the ground are first killed by rollers carried by diverging scraper members and located forwardly of said scrapers, then covered with soil by the scrapers. After the scrapers have covered the weevil and the eggs with soil, it will be seen that the heavy roller which is transversely disposed between the ends of the scrapers, will compress the soil thereby thoroughly embedding the weevil and eggs in the soil.

The invention having been set forth what is claimed as new and useful is:—

1. A boll weevil destroyer comprising a pair of spaced scraper members having their forward ends connected to a plow foot, said scraper members extending rearwardly and outwardly, rollers carried by said scraper members and disposed outwardly, and a transversely disposed roller extending between the rear ends of the scraper members.

2. A boll weevil destroyer comprising a pair of spaced scraper members, the forward ends of said scraper members being adjacent each other, a bolt extending through said forward ends and through a cultivator foot, said scraper members extending rearwardly and outwardly, rollers carried by said scrapers and spaced from the forward sides of the scrapers and in parallel relation to the scrapers and a transversely disposed roller rotatably mounted in bearings adjacent the rear ends of the scrapers.

3. A boll weevil destroyer comprising a pair of spaced scraper members having their forward ends detachably connecting to a cultivator foot, said scraper members extending rearwardly and outwardly from each other, outwardly extending brackets carried by the scraper members said brackets having rotatably mounted in bearings thereof ground engaging rollers, a transversely disposed roller disposed between the rear ends of the scrapers and in bearings carried by the scrapers, said transversely disposed roller being heavier than the scraper carried rollers, thereby forming means for thoroughly compacting the soil after it has been rolled by the light rollers and dragged over by the scrapers.

In testimony whereof I have signed my name to this specification in the presence of two subscribing witnesses.

CIM L. HARRISON.

Witnesses:
C. E. STEPHENS,
S. P. BIGGERSTAFF.